May 27, 1952 D. H. GRIDLEY 2,597,866

DATA CONVERSION SYSTEM

Filed June 2, 1949 2 SHEETS—SHEET 1

Inventor
DARRIN H. GRIDLEY

By M. A. Hayes
ATTORNEY

Inventor
DARRIN H. GRIDLEY

By M. A. Hayes

ATTORNEY

Patented May 27, 1952

2,597,866

UNITED STATES PATENT OFFICE 2,597,866

DATA CONVERSION SYSTEM

Darrin H. Gridley, Washington, D. C.

Application June 2, 1949, Serial No. 96,803

5 Claims. (Cl. 177—380)

Figure 1:
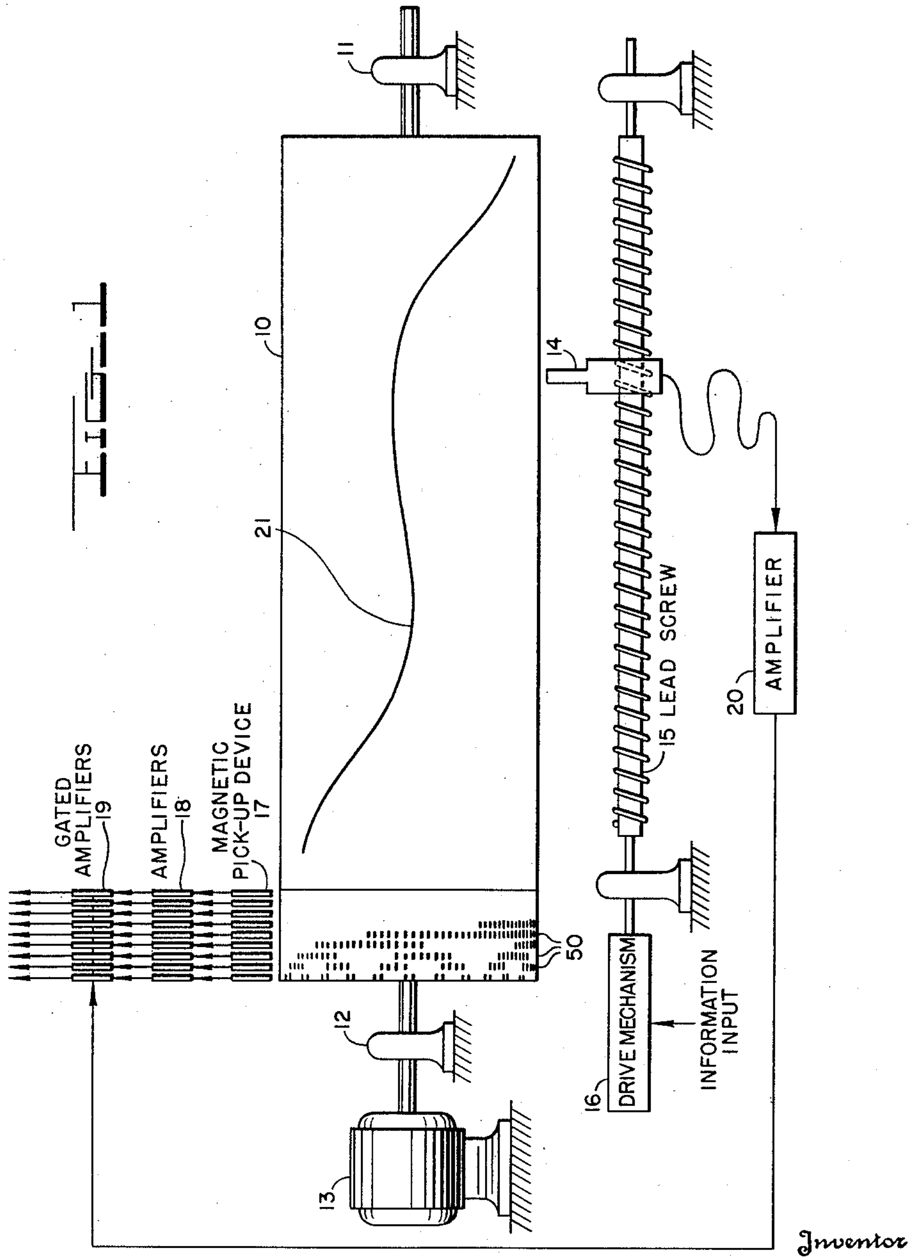

(Granted under the act of March 3, 1883, as amended April 30, 1928; 370 O. G. 757)

This invention relates to electrically represented data conversion systems and in particular to conversion systems responsive to input data to produce output data which can bear any given relationship thereto.

In numerous measuring and computing applications information supplied in one form must be converted into a second form which may have a linear, logarithmic, or even a random relationship thereto. Such a situation may be readily pictured in the case where it is desired to convert the measured height of a liquid contained in a tank having irregular shape into volume.

Electrical circuits suitable for handling linear and even logarithmic data conversion have been available in the past. However specific circuits and apparatus suitable for performing certain non-linear complex operations can become quite involved and are impractical in many cases. Where information is contained in an irregular relationship, it may even become necessary to resort to visual reading of calibration curves or tabulations and mental translation of data. Aside from the slowness inherent in such human operations where large quantities of data are involved, the ever present possibility of human error even though inadvertent, limits the operation of even the simplest calculating equipment.

In many applications involving electrical information storage and calculating equipment the information is generally conveyed as numbers but the decimal system as normally used is not readily handled by electrical apparatus such as relays, electronic counters and the like. Each decimal digit requires ten conditions to represent it whereas a simple relay is usually either open or closed with no reliable in-between position. So that such two position apparatus can be simply employed it is possible to make use of a completely different system of numbering known generally as the binary system in which only two conditions represent each value of the digits of the number.

For illustration the decimal numerals 0 to 15 may be represented mathematically by the following typical binary digit combinations in the cyclic form of binary notation:

| Decimal Numeral | Cyclic binary |
|---|---|
| 0 | 0000 |
| 1 | 1000 |
| 2 | 1100 |
| 3 | 0100 |
| 4 | 0110 |
| 5 | 1110 |
| 6 | 1010 |
| 7 | 0010 |
| 8 | 0011 |
| 9 | 1011 |
| 10 | 1111 |
| 11 | 0111 |
| 12 | 0101 |
| 13 | 1101 |
| 14 | 1001 |
| 15 | 0001 |

As above indicated a binary digital representation of the decimal numbers 0 to 15 inclusive requires a four place binary digit number in which each binary digit may be represented by the binary characters 0 or 1. Thus each binary digit has only two values and can be readily handled and/or indicated by ordinary relay or scale-of-two counter circuits having two conditions of stability.

As further apparent from the foregoing table, the quantity of decimal numbers that can be indicated by a given quantity of binary digits varies as 2 to the "N" power where "N" represents the number of places in the binary quantity.

The way in which the cyclic system is built up as binary digits are added is really quite simple once the principle is thoroughly understood. With reference to the representation for the numerals 8 through 15 in the tabulation which represent the positions added by the last (fourth) binary digit adding $2^{(n-1)}$ or 8 positions it will be noted that the (1) binary condition is indicated in the first digit column (right hand) for all numerals. The letter ($n$) in the algebraic expression indicates the quantity of binary digits present.

The second digit column has the (1) binary condition for the first $2^{(n-2)}$ numerals (8 through 11) and the (0) binary condition for the latter $2^{(n-2)}$ numerals.

The third digit column has the (0) binary condition represented for the first and last $2^{(n-3)}$ numerals and the (1) binary digit for the middle $2^{(n-2)}$ numerals.

The fourth digit column has the (0) binary condition represented for the first $2^{(n-4)}$ numerals with opposite binary conditions prevailing for alternate succeeding groups of $2^{(n-3)}$ numerals and the (0) binary condition again represented at the last $2^{(n-4)}$ numerals.

If five binary digits are employed the value of the digits in the fourth column will also follow the pattern just given, and the value of the fifth digit will be given in the fifth column in a similar manner with the value (0) for the first $2^{(n-5)}$ numerals and opposite binary conditions prevailing for alternate succeeding groups of $2^{(n-4)}$ numerals and the (0) binary condition again represented at the last $2^{(n-5)}$ numerals.

Such digital values are indicated on the figures with binary values including the numerals through six binary digits.

It is an object of the present invention to provide a data conversion system which will operate on electrically contained input information to automatically provide electrically contained output information in any given relationship to the input information.

Another object of the present invention is to provide a data conversion system which will operate with input information relative to a primary variable and supply output binary digital information having any given relation thereto.

Other and further objects and features of the present invention will become apparent upon a careful consideration of the accompanying drawings and detailed description.

Fig. 1 of the drawing shows a basic form of information converter system.

Figure 2:
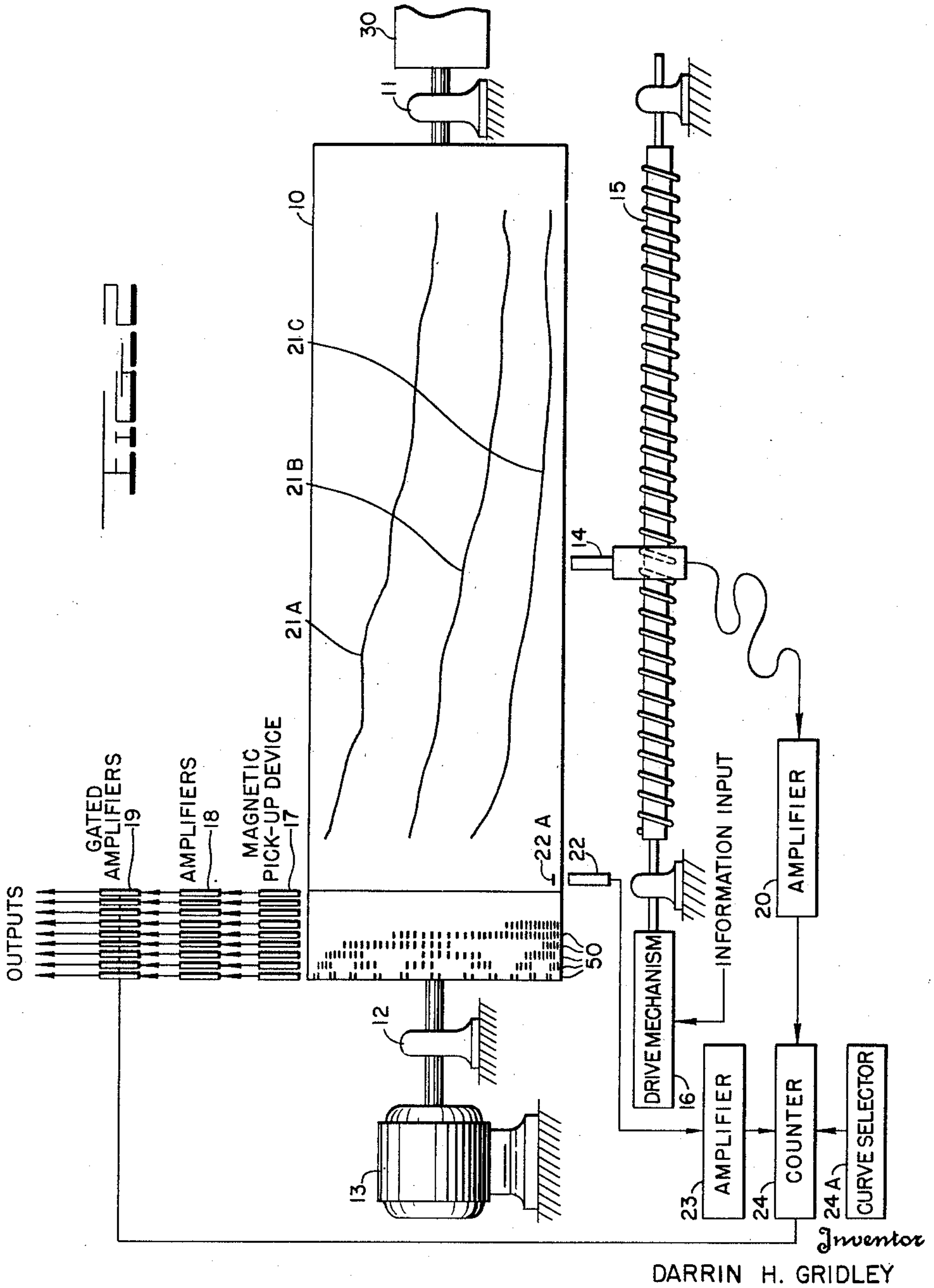

Fig. 2 shows a modified information conversion system suitable for operation with a plurality of conversion relationships.

In accordance with the fundamental features of the present invention, an electrical data conversion system is provided which will operate with input signals to provide output signals having any given predetermined mathematical relationship to the input. Generally described the apparatus employs a rotatable cylindrical signal storage member having output signals predeterminedly deposited along portions thereof and a signal plot of the desired mathematical input-output relationship deposited on other portions thereof in the desired relationship to the output signals. Signal pick-up devices cooperative with the output and plot signals are provided. The drum is rotated at preferably a constant speed. One signal pick-up device is moved linearly in a path parallel to the axis of the drum in accordance with input signal. Each time the plot of input-output relationship on the drum passes close to the one signal reception device a signal is produced to cause the other pick-up device to deliver output signals which characterize the mathematical relationship between input and output.

With particular reference now to Fig. 1 of the drawing a basic embodiment of the features of the present invention is shown in which a drum type member 10 suitably journalled as by bearings 11, 12 is rotated at a high speed by motor 13. The surface of drum 10 is of such composition that electrical signals are readily and permanently recorded thereon. Typically the type of surface employed can be such that it can be readily magnetized. It is to be appreciated that other forms of recording mediums could be employed.

Placed near the drum 10 and in operative communication therewith is a first magnetic pick-up device 17 which is held in a fixed position. Pick-up device 17 actually contains a plurality of adjacent magnetic pick-up heads which operate independently and are placed in a line which may be parallel to the axis of rotation of drum 10. A second magnetic pick-up device 14 containing a single head is slidably mounted near drum 10 and provided with motion substantially parallel to the axis of rotation of drum 10 by lead screw 15 in accordance with input signal supplied to drive mechanism 16. Drive mechanism 16 may be electrical in nature operating with motor, gear reduction unit and balancing potentiometer or may be a manual input such as a hand operated crank. In the typical tank calibration case the tank level information would be supplied at this point. The plot and output signals are placed on drum 10 in a very definite known relationship one to the other. In particular, the output signals are used to divide the periphery of the drum 10 into one degree intervals with each one degree interval being designated by a binary code signal. More particularly 360 output signals may typically be peripherally recorded in binary combinations on a plurality of juxtaposed tracks 50 cooperative with the fixed position magnetic pick-up heads 17. Thus to provide straight digital representation of 360 possible positions of the drum nine signal tracks 50 and nine pick-up heads 17 cooperative therewith are required. Under each head during rotation of the drum 10, passes a separate signal track which can have a short duration signal recorded therein in one sense for one binary condition (0) for example and in the opposite sense for the other binary condition or can have a short duration signal recorded of one sense for one binary value (0) and no signal for the other binary value (1). The signals recorded on the adjacent tracks 50 are arranged so that at any angular point on the drum the collective signals appearing at this point on the drive tracks designate a binary number indicative of the angular positions of the point considered with respect to a reference position. The signal tracks are shown in typical configuration by the marks in the tracks at the left hand end of drum 10 under pick-up heads 17 in Fig. 1.

Magnetic pick-up head 14 is so placed that it is near the surface of drum 10 and can be moved back and forth therealong in accordance with input information. In the portion of drum 10 cooperative with head 14 is recorded a group of signals which define a plot of the mathematical function to be solved and which may in effect appear as a continuous line 21. The purpose of these signals is to provide an output signal from head 14 once during each revolution of drum 10. Thus as drum 10 is revolved by motor 13 at high speed a signal will be induced in head 14 each time the signal plot 21 passes thereunder. This signal is applied to amplifier 20 and thence to gated amplifiers 19 which separately, independently, and substantially continuously receive amplified signals from amplifier 18 as derived by the fixed position magnetic heads 17 in accordance with the binary coded combinations placed on the nine signal tracks at the left hand end of drum 10.

With the pick-up head 14 mounted as shown on one side of drum 10 and the fixed position magnetic head 17 mounted on an opposite side of drum 10 bearing typically 180 degrees relationship therewith, a reference position can be selected for discussion so that as line 21 passes head 14 the zero binary combination will be present at that instant in the tracks under heads 17. If it is desired that the binary output coding for another position at head 14 be other than zero it will be necessary for the line 21 to be placed on drum 10 at that position of head 14 in such a manner that it will appear under head 14 at such instant in time that the desired binary output combination is present under heads 17. This procedure is followed throughout the entire length of the curve 21 on the surface of drum 10 and line 21 may be continuous or discontinuous, regular or irregular, as necessary to provide the correlation between input and output. At each position of head 14 as dictated by all of the possible values of input information, the placement of the corresponding portion of line 21 under head 14 is such that the desired output binary combinations will be simultaneously present under heads 17.

With respect to Fig. 2 a further advancement in the art of data conversion is shown. Fundamentally, the apparatus is the same as that of Fig. 1 however certain additions have been made thereto. To broaden the application of the basic apparatus, a plurality of input-output relationship curves such as the basic curve 21 of Fig. 1 have been placed on drum 10. These curves are represented on Fig. 2 by the numerals 21A, 21B and 21C and may be typically any group or family of curves which run adjacent one another but which do not intersect. Such a group or family of curves will be found in many fields or branches of science. A typical example of such information and conveying curves may be given in the electronic art where, for an electron tube, the characteristics of the plate current versus plate voltage for various values of control grid voltage are normally represented by such adjacent non-intersecting calibration. As before, the calibration curves are placed so that the value of an input variable, which in the typical case just mentioned may be plate voltage of the tube, is inserted by positional variation of head 14 through lead screw 15 in accordance with input information to drive mechanism 16. For each possible value of information supplied to head 14 a signal is placed on drum 10 as an appropriate portion of one of the lines 21A, 21B, 21C at such point that the value of plate current in the tube can be correctly represented by the binary combinations present at a given instant under the fixed position pick-up heads 17. These calibration curves in the typical case represent the various values of control grid voltage and each one upon passage thereof under head 14 will produce an output signal from head 14. Thus for each revolution of drum 10 a total of three signals will be supplied to amplifier 20. As before the amplified output from head 14 is employed to control through gated amplifiers 19 the output signals from amplifiers 18 derived by heads 17. To provide some means for positively identifying the curves 21A, 21B and 21C so that the gated amplifiers 19 will deliver output signals in coincidence with the presence of a selected curve under head 14 additional equipment, namely pick-up head 22, amplifier 23, counter 24 and curve selector 24A is provided. The purpose of this equipment is to transmit output signals from amplifier 20 in coincidence with only a selected one of curves 21A, 21B and 21C. The pick-up head 22 is responsive to a single signal 22A recorded in a track adjacent the binary digital output information track at the left-hand end of drum 10 and upon rotation of drum 10 will produce an output signal once during each revolution. This one output signal amplified by amplifier 23 is applied to a counter 24 which may be typically of the sequentially connected scale-of-two trigger circuit variety suitable to register the minimum of four positions (three positions for curves 21A, 21B and 21C, respectively, and one position for "off"). This single signal from pick-up 22 is employed to reset counter 24 to the "off" position once during each rotation of drum 10. Thereafter, as rotation of the calibration curves under head 14 induces signals therein these induced signals are applied to counter 24 from amplifier 20 to cause normal step by step operation thereof. When a desired step position has been reached by counter 24 as determined by curve selector 24A the signal produced upon passage of the selected curve under head 14A will cause the operation of gated amplifiers 19 to produce an output signal relative to the binary signals present at that instant under pick-up device 17. The curve selector 24A may typically be a group of switches connected to appropriate points in the trigger circuits operative to change the count thereof to provide an output signal from the counter only when a desired step or count from the zero position has been registered.

To assist in the precision recording of data in the code tracks 50 and on the calibration lines 21A, 21B and 21C, a removable vernier positioning device operable by hand has been shown on Fig. 2 as indicated in block 30. In such calibration operation, motor 13 is not operated and the vernier drive 30 is connected to the drum. By means of this device the drum can be positioned accurately at each point it is desired to record information in the code tracks 50 and the calibration curves 21A, 21B, 21C. With the drum thus positioned, the pick-up heads 17 and 14 can be momentarily energized to place a magnetically oriented spot on the portions of the drum which are under them. This procedure is followed along the drum wherever it is desired to place information. Subsequently before operation of the drum by motor 13 the vernier drive 40 is disconnected to prevent undue wear thereof.

From the foregoing discussion it is apparent that considerable modification of the present invention is possible without exceeding the scope thereof as defined in the appended claims. For example it is within the scope of the present invention to employ other forms of data coding than that shown and described, such as, a coded decimal or straight binary representation.

The invention described herein may be manufactured and used by or for the Government of the United States of America for governmental purposes without the payment of any royalties thereon or therefor.

What is claimed is:

1. Apparatus for converting input information from one state to another state having any given relation thereto comprising, a rotatable drum having a surface of a signal storage medium with signals stored thereon, first signal responsive means disposed in a fixed position near portions of said drum cooperative with signals stored thereon, second signal responsive means placed near the surface of the drum also cooperative with signals stored thereon, driver means moving said second signal responsive means in a path substantially parallel to the axis of rotation of the drum in dependency on input information, and gated electrical signal amplifier means connected to the first and second signal responsive means operative to deliver signals from the first signal responsive means upon occurrence of selected signals from the second signal responsive means.

2. Apparatus for converting input information from one state to another state having any given relationship to the one state comprising, a rotatable drum having calibration signals for one information coordinate recorded on portions thereof and a calibration curve signal on other portions thereof, first signal pick-up means disposed in proximity to the drum responsive to the portions of the drum carrying the calibration signals, second signal pick-up means disposed in proximity to the drum responsive to the calibration curve portions of the drum, driver means connected to said second signal pick-up means for moving said second signal pick-up means in a path substantially parallel to the axis of rotation of the drum as a second information coordinate in dependency on input information, and gated amplifier means connected to the first and second signal pick-up means operative to deliver signals relative to one information coordinate from the first pick-up means whenever a selected signal is produced by the passage of the recorded calibration curve signals in proximity thereto during rotation of the drum.

3. Apparatus for converting input information from one state to another state which can be non-linearly related thereto comprising, a first group of signal tracks carrying angular position coding therein, secondary signal tracks containing calibration expressive of relationship between input and output information, driver means rotating the signal tracks simultaneously at high speed, first signal pick-up means disposed in a fixed position in proximity to the first group of signal tracks responsive to the angular position coding contained in the first group of signal tracks, a second signal pick-up means disposed in proximity to a portion of the path of rotation of the calibration responsive to the calibration to deliver a gating signal upon the passage of the calibration in proximity thereto, signal input drive means moving the second signal pick-up means in a path substantially parallel to the axis of rotation of the signal tracks in accordance with input information whereby the angular position coding of the first group of signal tracks occurring in coincidence with the gating signal is varied in accordance with the calibration, and a gated amplifier connected to the first signal pick-up means and the second signal pick-up means responsive to the gating signal to deliver signals from the first signal pick-up means upon occurrence of the gating signal.

4. Apparatus for converting input information from one state to another state which can be non-linearly related thereto comprising, a first group of signal tracks carrying angular position coding therein, secondary signal tracks containing non-crossing calibration curves relating input and output information, a tertiary signal track containing a reference signal, driver means connecting the signal tracks rotating the signal tracks simultaneously at high speed, a first signal pick-up device disposed in a fixed position in proximity to the first group of signal tracks responsive to the position coding contained in the first group of signal tracks, a second signal pick-up device disposed in proximity to a portion of the path of rotation of the secondary signal tracks responsive to the calibration curves to deliver first gating signals upon the passages of the calibration curves in proximity thereto, signal input drive means moving the second signal pick-up device in a path substantially parallel to the axis of rotation of the signal tracks in accordance with input information whereby the position coding of the first group occurring in coincidence with the first gating signals is varied in accordance with the calibration curves, a counter registering the gating signals produced by the second signal pick-up device as the curves are driven thereunder providing an output coincidence signal when a selected count is registered, a third signal pick-up device disposed in proximity to the tertiary signal track responsive to the tertiary signal track for resetting the counter to a selected state each time a reference signal occurs, and a gated amplifier connected to the counter output and the first signal pick-up means to deliver signals from the first signal pick-up means upon occurrence of the gating signals.

5. A data conversion system for producing output signals bearing a predetermined mathematic relation to input signals comprising, a rotatable signal storage member having a series of output signals recorded thereon as one coordinate of a rectangular coordinate system and a plot of desired mathematical relationship recorded thereon as a signal track having the desired relationship to the output signals, first signal pick-up means disposed in a fixed position near said member cooperative with the output signals recorded thereon, second signal pick-up means movably placed near the rotatable member in cooperative relation to the signal plot, means moving said second signal pick-up means along a path describing the other coordinate in the rectangular coordinate system in dependency upon the input signal and means producing an output signal relative to one coordinate of the plot responsive to the instantaneous signals derived by the first signal pick-up means upon occurrence of an output signal from the second signal pickup means.

DARRIN H. GRIDLEY.

REFERENCES CITED

The following references are of record in the file of this patent:

UNITED STATES PATENTS

| Number | Name | Date |
|---|---|---|
| 1,891,035 | Young | Dec. 13, 1932 |
| 2,232,086 | Akker | Feb. 18, 1941 |
| 2,318,591 | Couffignal | May 11, 1943 |
| 2,332,304 | Davies | Oct. 19, 1943 |
| 2,397,604 | Hartley et al. | Apr. 2, 1946 |
| 2,405,603 | Parker et al. | Aug. 13, 1946 |
| 2,406,384 | Kinkhead et al. | Aug. 27, 1946 |